W. E. WORTHEN.
Waste-Water Detector.
No. 207,378. Patented Aug. 27, 1878.
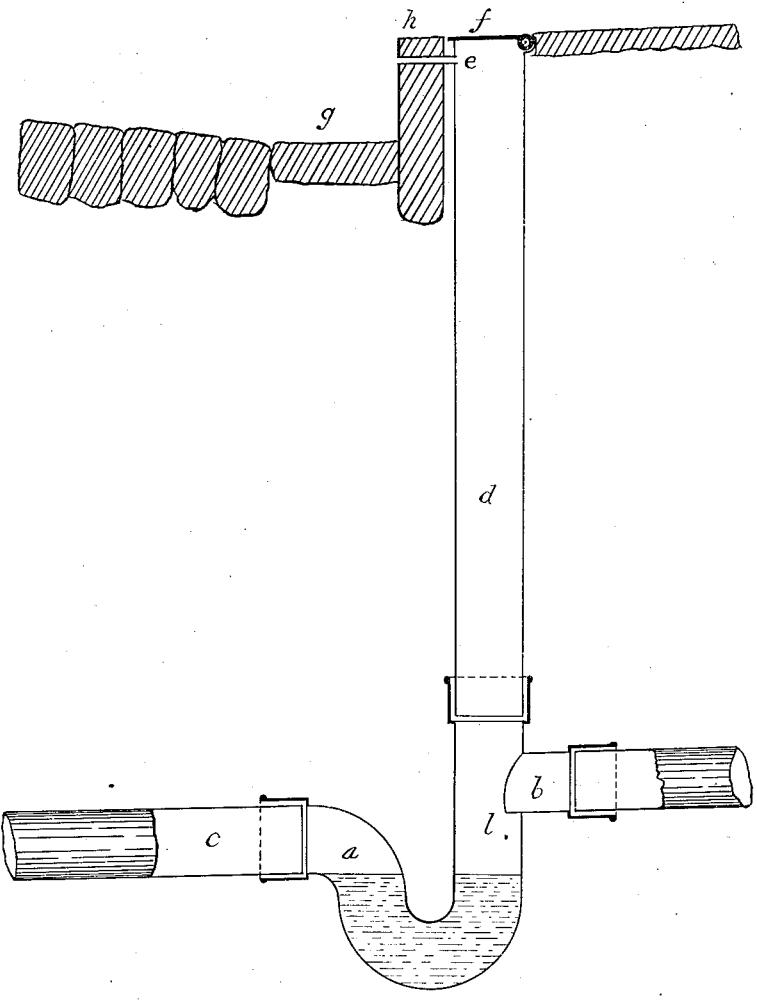
Attest:
Edward T. Wales
Chas. M. Higgins.
Inventor
William E. Worthen
by J. H. Wales & Son
Attys

UNITED STATES PATENT OFFICE.

WILLIAM E. WORTHEN, OF NEW YORK, N. Y.

IMPROVEMENT IN WASTE-WATER DETECTERS.

Specification forming part of Letters Patent No. 207,378, dated August 27, 1878; application filed May 8, 1878.

*To all whom it may concern:*

Be it known that I, WILLIAM EZRA WORTHEN, of the city, county, and State of New York, have invented a new form of Waste-Water Detecter in combination with the house sewer-pipe, of which the following is a specification:

Sanitary engineers generally recommend that there should be an exterior trap in all sewer-pipes leading from the buildings to prevent the foul air passing from the main or street sewer into the interior of the house, and in addition that this trap should have a vent as remote from the house as possible.

The aim of my invention is to provide a sewer-connection conforming to these sanitary requirements, with the definite and special purpose of affording at the same time a ready means of detecting the waste of water from imperfect services or from negligence without the inconvenience of domiciliary visits or the expense of water-meters.

The annexed drawing exhibits a vertical section of a sewer-connection on the above-mentioned sanitary principles, and embodying my invention for the detection of the waste-water from the building.

In the drawing, $a$ is the trap; $b$, the sewer or waste pipe leading from the building, and $c$ the pipe leading to the main or street sewer or outfall. $d$ is a vertical pipe, through which the flow from the waste-pipe $b$ may be observed and determined. This pipe has a vent at $e$ and a lid, $f$, to prevent extraneous matter from being thrown into the trap.

$h$ is the sidewalk-curb, and $g$ the street-gutter. $l$ is a projecting lip to the pipe $b$.

The trap and vent with its position near the curb are to conform to sanitary regulations.

My invention consists, mainly, in the combination and arrangement of the upright pipe $d$, devised to detect the flow of water through the waste-pipe $b$, in the manner hereinafter set forth and claimed.

In the drawing it will be observed that the discharge of the pipe $b$ is above the water of the trap $a$, which is at the level of the bottom of the pipe $c$. Therefore any water flowing from the pipe $b$ into the trap $a$ will make a ripple on the water of the trap, or will fall with a noise; and, that the slightest drip may be detected, the waste-pipe $b$ is made to project slightly into the upright pipe, forming a lip, $l$, from which even a flow by drops will show itself on the water of the trap by its free fall without trickling down the sides of the upright pipe.

By opening the lid $f$ of the upright pipe and placing the ear near it, the sound of the drip may be readily heard, and by throwing down a ray of light it may be readily seen, and for this purpose I propose to galvanize the interior of the upright pipe or paint it white.

The upright pipe not only permits the flow from the house to be seen and heard, but also enables it to be measured.

By suspending a small pail beneath the lip $l$ of pipe $b$ from a spring-balance above the sidewalk, the weight of water flowing into the pail in a noted time may be determined, or the time in which a pail of known measure is filled may be observed. The water-police, having in charge the examination of houses, will thus have no necessity to enter them, but, noting through the upright pipe $d$ the flow from the house-sewer during the night-hours, or when the water-service is not in use in the building, can give notice to the occupants of the house of the fact of waste, with a caution that it be stopped, and if afterward it is still found continued the quantity of waste-water may be determined if necessary, and a fine or charge for such waste be made.

If the house sewer-pipe be carried out through the roof of the building, as now required by sanitary boards, there will be an almost constant circulation from the vent $e$ downward through the short leg of the siphon $d$ and up through the long leg of the soil-pipe to the roof of the house. The same will obtain when the lid $f$ is open. The air in the soil-pipe will thus be kept fresh, and there will be little if any escape of gas at the curb.

What I claim as my invention is—

1. The combination of an upright observatory pipe, $d$, with the waste-pipe from a building and its connecting sewer, the outlet or discharge of the said waste-pipe being arranged to open into the base of the observatory pipe at a point above the level of its outflow to the sewer, substantially as and for the purpose set forth.

2. The combination of an upright pipe, $d$, rising from the sewer-pipe, with a waste-pipe from a building, having its discharge-aperture provided with a projecting lip, $l$, extending into the upright pipe at a point above the level of its outflow, substantially as and for the purpose set forth.

3. The combination of an upright observatory pipe, $d$, rising from the trap of a sewer-pipe, with the waste-pipe from a building, arranged to discharge into the upright pipe above the water-level of the trap, substantially as herein shown and described.

WILLIAM EZRA WORTHEN.

Witnesses:
EDWARD H. WALES,
CHAS. M. HIGGINS.